H. L. KNUDSEN.
VALVE MECHANISM.
APPLICATION FILED JAN. 26, 1918.
1,427,111.
Patented Aug. 29, 1922.
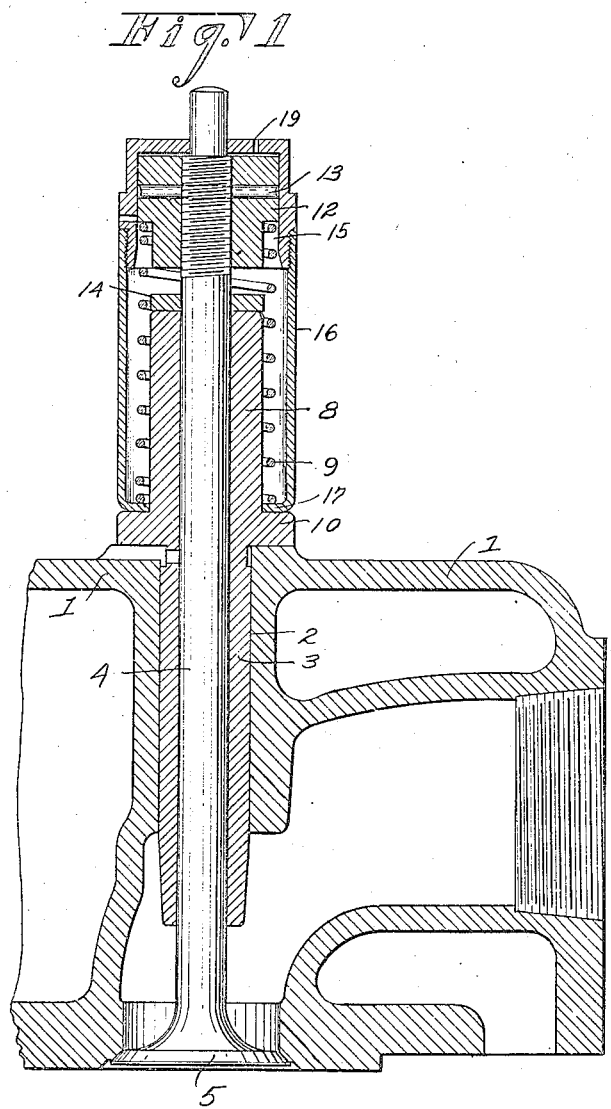
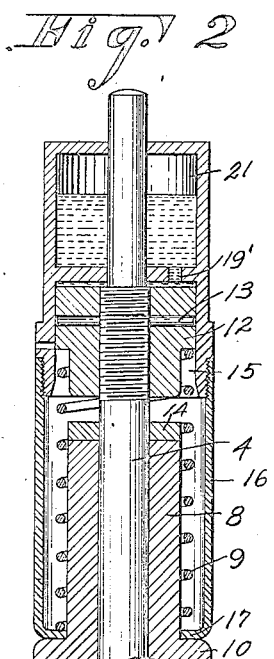
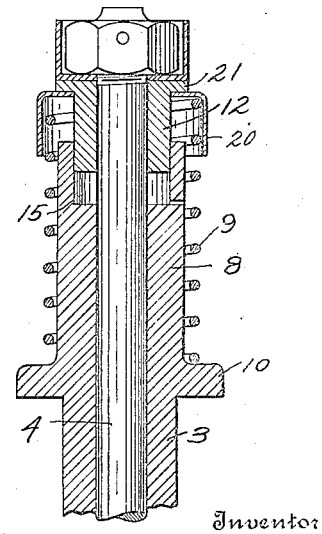

UNITED STATES PATENT OFFICE.

HANS L. KNUDSEN, OF MILWAUKEE, WISCONSIN.

VALVE MECHANISM.

1,427,111.      Specification of Letters Patent.      Patented Aug. 29, 1922.

Application filed January 26, 1918. Serial No. 213,647.

*To all whom it may concern:*

Be it known that I, HANS L. KNUDSEN, a citizen of Denmark, residing at Milwaukee, county of Milwaukee, and State of Wisconsin, have invented new and useful Improvements in Valve Mechanisms, of which the following is a specification.

My invention relates to improvements in valve mechanisms, particularly in such forms of poppet valve mechanisms as are adapted for use at the inlet and exhaust ports of internal combustion engines.

The object of my invention is to provide a valve which will be quick acting, but automatically controlled so as to seat noiselessly and without hammering. More specifically, I aim to produce an automatic valve, the stem of which is provided with a plunger which operates in a cylinder on the principle of the dash pot, to reduce the impact of the quick acting valve at the extreme limit of its movement.

The ordinary poppet valve used in gasoline engines is noisy because its operation is necessarily rapid and there has heretofore been no way of preventing the sharp metallic sound arising from the impact of the valve and of the metal stops which limit its movement. It is the ordinary custom to equip such valves with springs, against which the valve acts in opening and which re-act to force the valve to its seat. A valve actuating spring of this sort is usually under sufficient compression so that it cushions the opening movement of the valve, but causes a correspondingly quickened closing movement, seating the valve with great force. In my improved valve mechanism, however, the valve is guarded against excessive impact in either direction. Since the sole function of the spring in my improved valve is to actuate the valve to a closed position, and since separate cushioning means are employed, it is possible to use a much lighter spring than is used in the ordinary construction. The advantages of this improvement are evidenced by a quickened opening action and quiet operation.

In the drawings:—

Figure 1 is a vertical section through a valve mechanism embodying my invention.

Figures 2 and 3 are fragmental sections through certain modified structures also embodying my invention.

Like parts are identified by the same reference characters throughout the several views.

A cylinder casting 1 provided with a port 2 is fitted with the sleeve bearing 3 through which the stem 4 of valve 5 is adapted to project in the usual manner. It is immaterial whether the valve seats in the cylinder head as shown or in a valve cage.

The guide member 8 is of tubular shape and extends outwardly from the casting, enclosing the valve stem 4 and serving as a guide for spring 9. Flange 10 on the guide member supports one end of said spring and bears against the casting. The valve stem is threaded near its outer end to receive a piston 12, which, having been positioned thereon, is secured by cotter pin 13. The inner portion of the piston 12 is adapted to receive and support the spring 9. It also serves as a stop to limit the opening movement of the valve. The piston 12 is so placed upon the valve stem that, when the valve is open to the desired degree, the piston will strike upon the outer end of guide member 8, a washer or disk 14 of vulcanized rubber, fiber, or the like being preferably interposed to absorb the shock and prevent noise.

The piston 12 is adapted to reciprocate in a cylinder 15 which is held in place by a tubular extension 16, enclosing the spring 9. The tube 16 has a flange 17 at its inner end which is interposed between the spring 9 and the flange 10 of the guide member. The pressure of the spring normally holds the valve upon its seat and may also hold cylinder 15 and tube 16 tight against the casting 1. At its extreme outer end, the valve stem 4 is preferably turned to a smaller diameter and passes through the cylinder 15 to position the latter, and also to permit of manual manipulation of the valve. A small hole 19 permits the passage of air through the wall of cylinder 15. The capacity of this hole determines the resistance to the piston movement.

In the modified form shown in Figure 2, an extension of the cylinder 15 forms a box-like enclosure 21 communicating with said cylinder by means of opening 19, and in this construction, liquid may be employed as the motion restricting agent.

Figure 3 sets forth still further modifications, whereby fluid may be utilized to control the piston movement. In this form of construction, the bearing 3 and guide member 8 are formed integrally and cylinder 15 is located at the end thereof. Piston 12 is mounted at the end of the valve stem, its inner face being the working surface, and a cup 20 supports the spring 9 and bears against flange 21 on the piston to hold the valve to its seat. Tubular member 16 is thereby dispensed with.

The operation of this valve mechanism will be evident. The spring 9 being light, the valve 5 will start to open automatically as soon as a slight degree of vacuum is developed in the engine cylinder. The opening movement will be rapid but as it progresses, the piston 12 moving in cylinder 15 will tend to form a vacuum which will only be partially relieved by air rushing through the small opening 19. The valve movement is checked materially only near the end of the stroke, after which, it is stopped by the contact of piston 12 with the non-metallic washer 14. When the vacuum in the engine cylinder is relieved, the valve will begin to close. Piston 12 then compresses such air in cylinder 15 as cannot escape through opening 19. Not enough resistance will be offered to materially check the valve movement until the seating is almost effected. At the moment when the valve reaches its seat, however, there will be sufficient compression in cylinder 15 to resiliently stop the valve movement.

In the modified form shown in Figure 2, the opposition to the valve movement in either direction will be more constant and will operate during the entire period of valve movement instead of being a decided opposition apparent only at the extreme limits of such movement. This is particularly true if liquid is used, but it is also true to some extent, if air is used, although in such case, the opening 19' between the cylinder 15 and chamber 21 will be smaller than it will be for liquid. All of the fluid entering or leaving cylinder 15 is, nevertheless, confined in box 21 and a vacuum, (or pressure), will therefore appear sooner in the cylinder if the communicating chamber 21 is also under vacuum or pressure as the case may be.

The structure shown in Figure 3 will operate much like that of Figure 1, except that it is arranged oppositely so that the valve opening movement is met by a compression of air and the closing movement causes a vacuum. The three embodiments of my invention illustrated are not intended to show all possible forms of my invention, but I have illustrated different forms merely as showing that my improvement has a wide range of equivalence.

I claim:

1. A valve mechanism comprising a valve seat, a valve adapted to cooperate therewith, a stem rigidly connected to said valve, an elongated guide surrounding said stem, a relatively stationary cylinder located adjacent the outer end of said stem, a piston operating in said cylinder to cushion the closing movement of said valve, and a cushioning member interposed between said piston and said guide to cushion and limit the motion of said valve in the opening direction.

2. In combination with an internal combustion engine, of a valve mechanism comprising a valve, a guide therefor adapted to be secured to said engine and having an outwardly projecting shank, and a flange adjacent the inner end of said outwardly projecting shank, a cylindrical casing surrounding said shank, and having an inturned portion seating upon said flange, a piston carried by the outer end of said valve stem, a cylinder carried by said casing and cooperating with said piston, and a spring bearing at one end upon the inturned portion of said casing to hold such casing firmly against such flange and bearing at the other end against said piston and exerting a force tending to seat said valve.

In testimony whereof I affix my signature in the presence of two witnesses.

HANS L. KNUDSEN.

Witnesses:
O. C. WEBER,
LEVERETT C. WHEELER.